(12) United States Patent
Stachowiak et al.

(10) Patent No.: US 6,934,085 B2
(45) Date of Patent: Aug. 23, 2005

(54) FIRST SURFACE MIRROR WITH CHROMIUM INCLUSIVE NUCLEATION LAYER

(75) Inventors: Anna Stachowiak, Ann Arbor, MI (US); Grzegorz Stachowiak, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/689,532

(22) Filed: Oct. 21, 2003

(65) Prior Publication Data

US 2005/0083576 A1    Apr. 21, 2005

(51) Int. Cl.[7] .................................................. G02B 1/10
(52) U.S. Cl. ...................... 359/585; 359/586; 359/589; 359/580
(58) Field of Search ................. 359/577, 580, 359/584, 585, 586, 589; 428/428, 432

(56) References Cited

U.S. PATENT DOCUMENTS

| | | | |
|---|---|---|---|
| 4,101,707 A | 7/1978 | Henry | |
| 4,255,214 A | 3/1981 | Workens | |
| 4,309,075 A | 1/1982 | Apfel et al. | |
| 4,780,372 A | 10/1988 | Tracy et al. | |
| 5,583,704 A | * 12/1996 | Fujii | ......................... 359/884 |
| 5,669,681 A | 9/1997 | Ishikawa et al. | |
| 5,896,236 A | 4/1999 | Lostumo et al. | |
| 5,923,464 A | 7/1999 | Braun | |
| 5,930,046 A | 7/1999 | Solberg et al. | |
| 5,976,683 A | 11/1999 | Liehrr et al. | |
| 6,275,272 B1 | 8/2001 | Park | |
| 6,495,263 B2 | 12/2002 | Stachowiak | |
| 6,544,716 B1 | 4/2003 | Hajjar et al. | |
| 6,586,102 B1 | 7/2003 | Stachowiak | |
| 6,587,263 B1 * | 7/2003 | Iacovangelo et al. | ........ 359/359 |
| 6,602,608 B2 | 8/2003 | Stachowiak | |

* cited by examiner

Primary Examiner—Fayez G. Assaf
(74) Attorney, Agent, or Firm—Nixon & Vanderhye P.C.

(57) ABSTRACT

A first surface mirror includes a reflective layer and one or more dielectric layers. A chromium (Cr) inclusive layer is provided under the reflective layer in order to improve durability and/or optical characteristics of the first surface mirror. In certain example embodiments, a silicon nitride inclusive layer may be located under the Cr inclusive layer to provide for still further improvements.

11 Claims, 4 Drawing Sheets

PROJECTION TELEVISION (PTV)

FIRST SURFACE MIRROR WITH CHROMIUM INCLUSIVE NUCLEATION LAYER

This application is related to a first-surface mirror including a chromium (Cr) inclusive nucleation layer provided between the glass substrate and the reflective layer (e.g., Al layer). In certain example embodiments, such first surface mirrors may be used in the context of a projection television (PTV) apparatus, or any other suitable application.

BACKGROUND OF THE INVENTION

Mirrors for various uses are known in the art. For example, see U.S. Pat. Nos. 5,923,464 and 4,309,075 (all hereby incorporated herein by reference). Mirrors are also known for use in projection televisions and other suitable applications. In the projection television context, see for example U.S. Pat. Nos. 6,275,272, 5,669,681 and 5,896,236 (all hereby incorporated herein by reference).

One type of mirror is a second or back surface mirror (most common), while another type of mirror is a first or front surface mirror (less common). Back surface mirrors typically include a glass substrate with a reflective coating on a back surface thereof (i.e., not on the front surface which is first hit by incoming light). Incoming light passes through the glass substrate before being reflected by the coating in a second surface mirror. Thus, reflected light passes through the glass substrate twice in back or second surface mirrors; once before being reflected and again after being reflected on its way to a viewer. In certain instances, passing through the glass substrate twice can create ambiguity in directional reflection and imperfect reflections may sometimes result. Mirrors such as bathroom mirrors, bedroom mirrors, and architectural mirrors are typically back or second surface mirrors so that the glass substrate can be used to protect the reflective coating provided on the rear surface thereof.

In applications where more accurate reflections are desired, front (or first) surface mirrors are often used. In front/first surface mirrors, a reflective coating is provided on the front surface of the glass substrate so that incoming light is reflected by the coating before it passes through the glass substrate. Since the light to be reflected does not have to pass through the glass substrate in first surface mirrors (in contrast to rear surface mirrors), first surface mirrors generally have higher reflectance than do rear surface mirrors, and no double reflected image. Example front surface mirrors (or first surface mirrors) are disclosed in U.S. Pat. Nos. 5,923,464 and 4,780,372 (both incorporated herein by reference).

Many first surface mirror reflective coatings include a dielectric layer(s) provided on the glass substrate over a reflective layer (e.g., Al or Ag). Unfortunately, when the coating becomes scratched or damaged in a front surface mirror, this affects reflectivity in an undesirable manner as light must pass through the scratched or damaged layer(s) twice before reaching the viewer (this is not the case in back/rear surface mirrors where the reflective layer is protected by the glass). Coatings typically used in this regard are not very durable, and are easily scratched or otherwise damaged leading to reflectivity problems. Thus, it can be seen that front/first surface mirrors are very sensitive to scratching. Other possible cosmetic problems associated with first surface mirrors include pinhole formations, adhesion, and/or reflectivity level.

For example, prior art FIG. 1 of the instant application illustrates a first surface mirror including glass/Al/$SiO_2$/$TiO_2$, where the Al reflective layer is deposited directly onto the glass substrate. Such mirrors suffer from problems such as poor adhesion, pinholes, poor scratch and abrasion resistance, and other durability and cosmetic problems. These durability problems are particularly evident when float glass (soda lime silica glass) is used as the substrate.

It will be apparent from the above that there exists a need in the art for a first/front surface mirror that is less susceptible to scratching, pinhole formations, and/or the like. In certain example embodiments, better adhesion and/or higher reflectivity may also be achieved.

BRIEF SUMMARY OF EXAMPLE EMBODIMENTS OF INVENTION

In certain embodiments of this invention, a chromium (Cr) inclusive nucleation layer is provided under the reflective layer (e.g., Al layer). It has surprisingly been found that providing a Cr inclusive layer immediately under and contacting the reflecting layer significantly improves durability of the resulting first surface mirror. In certain example embodiments, it has also been found that the Cr inclusive nucleation layer results in better adhesion and/or higher reflectivity for the first surface mirror.

The Cr inclusive layer is a good nucleation layer for the reflective material such as aluminum (Al). Cr also adheres well to glass, and can tolerate imperfect cleanliness on the glass surface. It has unexpectedly been found that Al inclusive reflective layers deposited over a nucleation layer comprising Cr grow denser and harder, and with fewer pinholes; compared to situations where the Cr inclusive layer is not present.

In certain example embodiments of this invention, an optional dielectric layer comprising silicon nitride may be provided between the glass substrate and the Cr inclusive nucleation layer.

In certain example embodiments of this invention, such first surface mirrors may be used in projection televisions, copiers, scanners, bar code readers, overhead projectors, and/or any other suitable applications.

In certain example embodiments of this invention, there is provided a first surface mirror comprising: a substrate supporting a coating, wherein the coating includes at least a reflective layer, first and second dielectric layers, and a Cr inclusive layer, and wherein the Cr inclusive layer is located directly under and contacting the reflective layer in order to improve at least durability of the first surface mirror.

DETAILED DESCRIPTION OF THE INVENTION

The instant invention relates to a mirror that may be used in the context of projection televisions (PTVs), copiers, scanners, bar code readers, overhead projectors, and/or any other suitable applications. In certain embodiments, the mirror is a first surface mirror that includes a chromium (Cr) inclusive nucleation layer located under a reflective layer. The reflective layer (e.g., Al, Ag, and/or the like) may be covered by at least one dielectric layer(s). Optionally, a silicon nitride inclusive layer may be provided between the Cr inclusive nucleation layer and the glass substrate.

Figure 2:
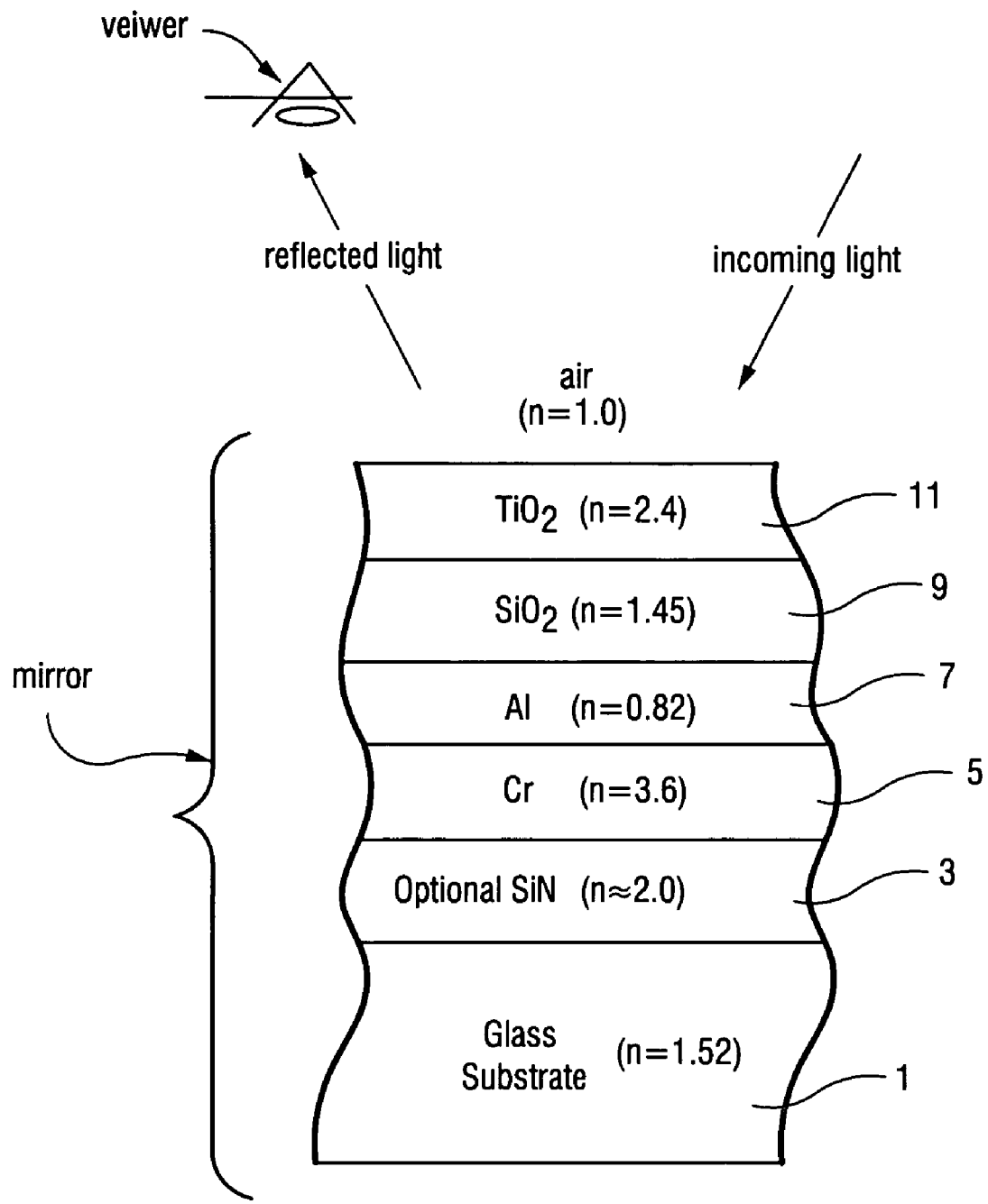
FIG. 2 is a cross sectional view of a first surface mirror according to an example embodiment of this invention.

FIG. 2 is a cross sectional view of a first surface mirror according to an example embodiment of this invention. The first surface mirror of FIG. 2 includes glass substrate 1, optional dielectric layer 3, Cr inclusive nucleation layer 5, reflective layer 7, dielectric layer 9 and dielectric overcoat layer 11. Glass substrate 1 may be from about 1–10 mm thick in different embodiments of this invention, and may be any suitable color (e.g., grey, clear, green, blue, etc.). In certain example instances, glass (e.g., soda lime silica type glass) substrate 1 is from about 1–5 mm thick, most preferably about 3 mm thick. When substrate 1 is glass, it may have an index of refraction value "n" of from about 1.48 to 1.53 (most preferably about 1.51 to 1.52).

Reflective layer 7 may be of or include Al or any other suitable reflective material in certain embodiments of this invention. Reflective layer 7 reflects the majority of incoming light before it reaches glass substrate 1 (or Cr inclusive layer 5) and directs it toward a viewer away from the glass substrate, so that the mirror is referred to as a first surface mirror. In certain embodiments, reflective layer 7 has an index of refraction value "n" of from about 0.05 to 1.5, more preferably from about 0.05 to 1.0. When layer 7 is of Al, the index of refraction "n" of the layer 7 may be about 0.8, but it also may be as low as about 0.1 when the layer 7 is of Ag. In certain example embodiments of this invention, a metallic layer 7 of Al may be sputtered onto the substrate 1 using a C-MAG rotatable cathode Al inclusive target (may or may not be doped) and/or a substantially pure Al target (>=99.5% Al) (e.g., using 2 C-MAG targets, Ar gas flow, 6 kW per C-MAG power, and pressure of 3 mTorr), although other methods of deposition for layer 7 may be used in different instances. For example, planar target(s) may also be used. In sputtering embodiments, the target(s) used for sputtering Al layer 7 may include other materials in certain instances (e.g., from 0–5% Si). Reflective layer 7 in certain embodiments of this invention has a reflectance of at least 75% in the 500 nm region as measured on a Perkin Elmer Lambda 900 or equivalent spectrophotometer, more preferably at least 80%. Moreover, in certain embodiments of this invention, reflective layer 7 is not completely opaque, as it may have a small transmission in the aforesaid wavelength region of from 0.1 to 10%, more preferably from about 0.5 to 1.5%. Reflective layer 7 may be from about 10–150 nm thick in certain embodiments of this invention, more preferably from about 20–90 nm thick, even more preferably from about 25–60 nm thick, with an example thickness being about 33 nm when Al is used for layer 7. Example materials for reflective layer 7 include metallic Al; Al—Cr alloy; 6061 alloy which includes Al and Cr; and/or Ag.

Dielectric layers 9 and 11 may be made of any suitable material, although in certain example embodiments of this invention dielectric layer 9 is of or includes silicon oxide (e.g., $SiO_2$, or other suitable stoichiometry) and layer 11 is of or includes titanium oxide (e.g., $TiO_2$, or other suitable stoichiometry).

In certain example embodiments of this invention, dielectric layer 11 has a higher index of refraction "n" than does dielectric layer 9; and layer 9 has a higher index of refraction "n" than does reflective layer 7. In certain example embodiments, layer 11 has an index of refraction "n" of from about 2.2 to 2.6, more preferably from about 2.3 to 2.5; layer 9 has an index "n" of from about 1.4 to 1.8, more preferably from about 1.4 to 1.6; and layer 7 has an index "n" of from about 0.1 to 1.2, more preferably from about 0.7 to 1.0.

Figure 1:
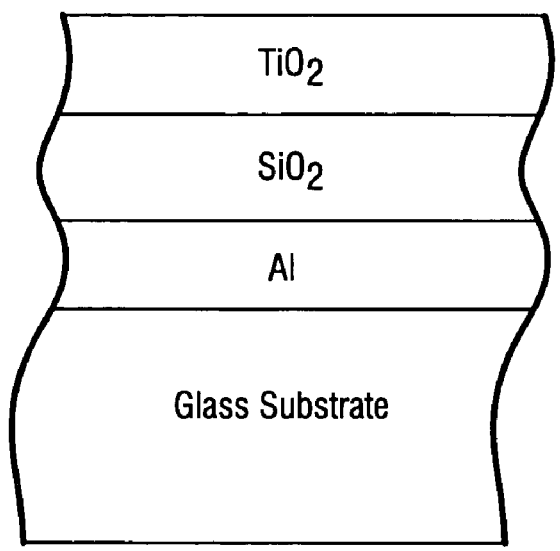
FIG. 1 is a cross sectional view of a conventional first surface mirror.

Surprisingly, it has been found that providing Cr inclusive nucleation layer 5 immediately under and contacting the Al reflective layer 7 allows for the durability of the resulting mirror to be significantly improved. In particular, the aforesaid durability problems of the FIG. 1 prior art can be greatly reduced by providing a Cr inclusive layer 5 under the reflective layer 7. The Cr inclusive layer 5 is a good nucleation layer for the reflective material such as aluminum (Al) of layer 7. Cr also adheres well to glass, and can tolerate imperfect cleanliness on the glass surface. Al reflective layers 7 deposited over Cr inclusive nucleation layers 5 grow denser and harder, and with fewer pinholes; compared to situations where the Cr inclusive layer is not present. Thus, improved durability results. Cr inclusive nucleation layer 5 may be of or include metallic Cr in certain example embodiments of this invention. However, in other example embodiments of this invention, the Cr inclusive layer 5 may be of or include an oxide and/or nitride of Cr. In certain example embodiments of this invention, Cr inclusive layer 5 may be from about 10 to 100 Å thick, more preferably from about 15 to 70 Å thick, and most preferably from about 20 to 40 Å thick.

Optionally, another dielectric layer 3 may be provided under the Cr inclusive nucleation layer 5. In certain embodiments, the dielectric layer 3 may be of or include silicon nitride which may or may not be doped with Al, stainless steel, or other metal. In certain example embodiments, dielectric layer 3 has an index of refraction "n" of from about 1.5 to 2.5, more preferably from 1.8 to 2.2, and most preferably from about 1.95 to 2.10. Surprisingly, it has been found that the provision of the silicon nitride inclusive layer 3 under the Cr inclusive layer 5 allows reflectivity and/or durability of the mirror to be improved. For example, tests have shown that Cr films deposited over a silicon nitride undercoat 3 are much more scratch and abrasion resistant than are Cr films deposited directly on glass (measured by a Teledyne Scratch Test and Taber Abrasion Test). Furthermore, FIG. 3 discussed below illustrates that first surface mirrors including such a silicon nitride inclusive layer 3 unexpectedly have improved reflectivity. In certain example embodiments of this invention, silicon nitride inclusive layer 3 may be from about 10 to 250 Å thick, more preferably from about 20 to 100 Å thick.

The silicon nitride inclusive layer 3 improves optical performance through packing density, reducing roughness and pinhole density of the film. The silicon nitride effectively prepares a clean surface for the Cr, since the silicon nitride reacts easily with water thereby taking oxygen away from glass surface water and turning it into oxide(s). Thus, the quality of the overlying films can be improved through the use of this silicon nitride inclusive layer 3. It is unclear why the silicon nitride improves (increases) reflectivity. However, the following may provide a possible explanation. With a better nucleation layer, Al grows denser and more smooth, which improves spectral reflectivity. Thus, the silicon nitride improves the quality of Cr inclusive nucleation layer 5, which in turn improves the quality of the Al reflective layer.

In certain embodiments of this invention, the Cr inclusive nucleation layer has a index of refraction value "n" of from 3.4 to 3.8, more preferably from 3.5 to 3.7, and most preferably about 3.6; and a "k" value of from 4.4 to 4.8, more preferably from 4.5 to 4.7; and most preferably about 4.5. These values are especially important in embodiments when the thickness of the Al reflective layer is reduced.

Those skilled in the art will appreciate that the term "between" as used herein does not mean that a layer between two other layers has to contact the other two layers (i.e., layer A can be "between" layers B and C even if it does not contact layer(s) B and/or C, as other layer(s) can also be provided between layers B and C).

By arranging the respective materials and indices of refraction "n" of the example layers 3–11 discussed above, it is possible to achieve a scratch resistant and thus durable first surface mirror. Moreover, the first surface mirror may have a visible reflection of at least about 80%, more preferably of at least about 85%, still more preferably of at least 90%, and even at least about 95% in certain embodiments of this invention.

In certain example embodiments of this invention, there are two possible basic film design options. One is to deposit only a very thin optically insignificant Cr (with or without SiN layer 3) nucleation layer 5, and then deposit standard enhanced Al 7 on that nucleation layer 5. Such a solution results in enhanced cosmetics and improved durability, while optical performance would be practically identical with similar structures not using the Cr. The other possible option is to reduce the thickness of the Al layer 7 compared to standard Al reflective layers, and increase the thickness of the Cr inclusive layer 5 to partially compensate for the loss of reflectivity due to the Al thickness reduction. Such a film may have slightly worse optical performance, but would be more durable mechanically and chemically. For purposes of example only, the Al layer 7 thickness may be reduced from 600 to 200 Å, with luminosity loss of less than 1% when a 250 Å Cr layer 5 is used.

Figure 4:
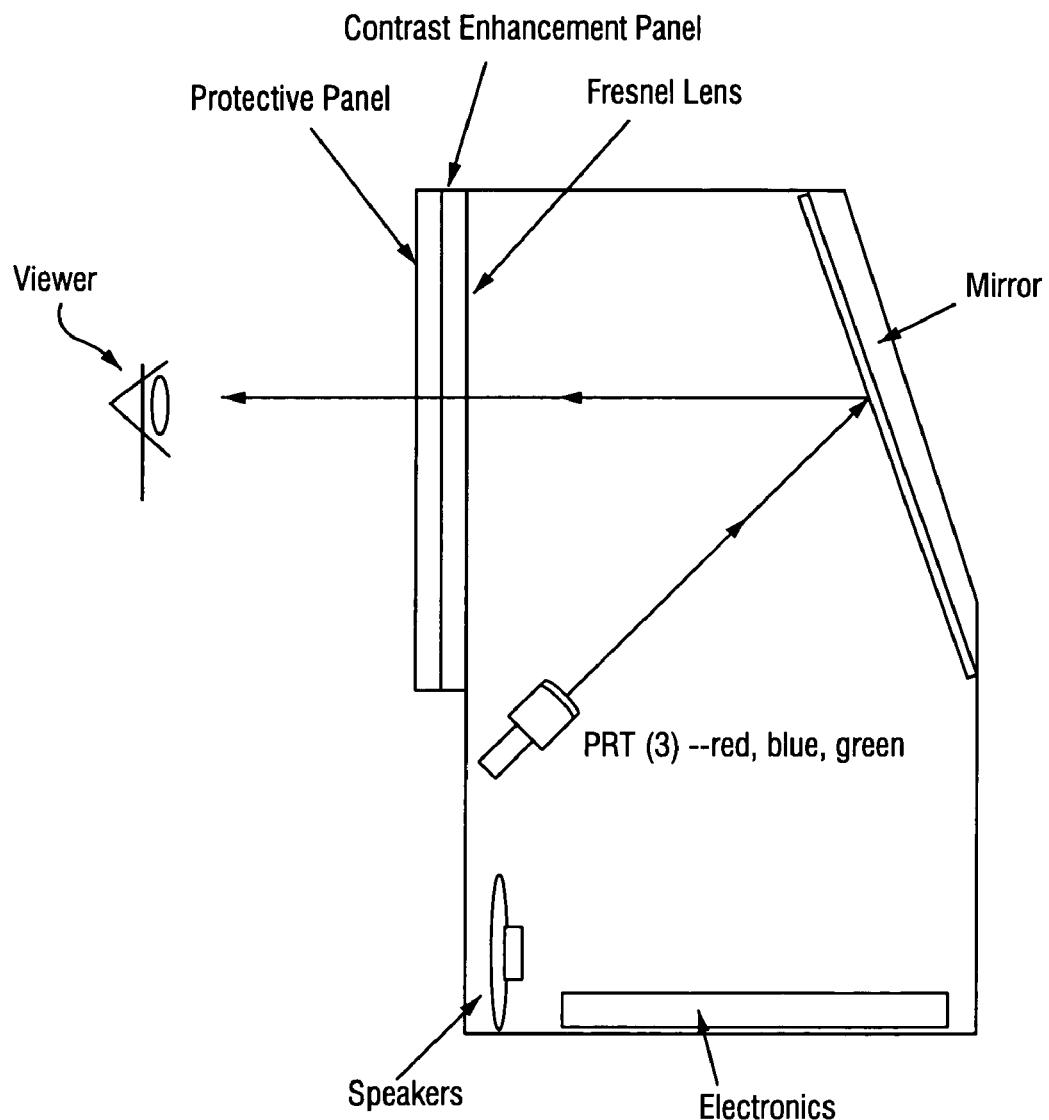
FIG. 4 is a schematic diagram illustrating a first surface mirror according to an example embodiment of this invention being used in the context of a projection television apparatus.

FIG. 4 is a schematic diagram illustrating the mirror of FIG. 2 being used in the context of a projection television (PTV). Light is directed toward and reflected by the mirror which in turn directs the light toward a Fresnel lens, contrast enhancement panel, and/or protective panel after which it ultimately proceeds to a viewer. The improved features of the mirrors discussed herein enable an improved PTV to be provided.

EXAMPLES

The following examples were made and tested, but are not intended to be limiting. Examples 1–3 below according to different embodiments of this invention are compared to a Comparative Example (CE) similar to prior art FIG. 1 in order to illustrate example advantages associated with certain embodiments of this invention. Each example used soda lime silica glass about 3 mm thick as the substrate 1. In the Examples below, all Cr layers were about 30 Å thick; all Al layers were made of 6061 alloy about 330 Å thick; the $CrN_x$ (chromium nitride) layer was about 40 Å thick; and the $Si_3N_4$ layer was about 50 Å thick. Dielectric layers 9 and 11 were not used in these examples, for purposes of simplicity.

The Examples had the following layers stacks:
Example 1: glass/Cr/Al
Example 2: glass/$Si_3N_4$/Cr/Al
Example 3: glass/$CrN_x$/Al
Comparative Example: glass/Al For each example, the glass substrate was cleaned with DI water and detergent using practices typical for lab coater substrate preparation (such cleaning is not perfect, which highlights the advantages of the Cr inclusive layers). All examples, after being formed by sputter deposition, were evaluated using a Scotch Tape Pull Test and paper tissue rub immediately after sputter coating and, at a later time, with MIL-CCC-C-440 cheesecloth Moderate Abrasion Test (1–1¼ lb. force abrader). Optical performances (see FIG. 3) were measured shortly after deposition.

Figure 3:
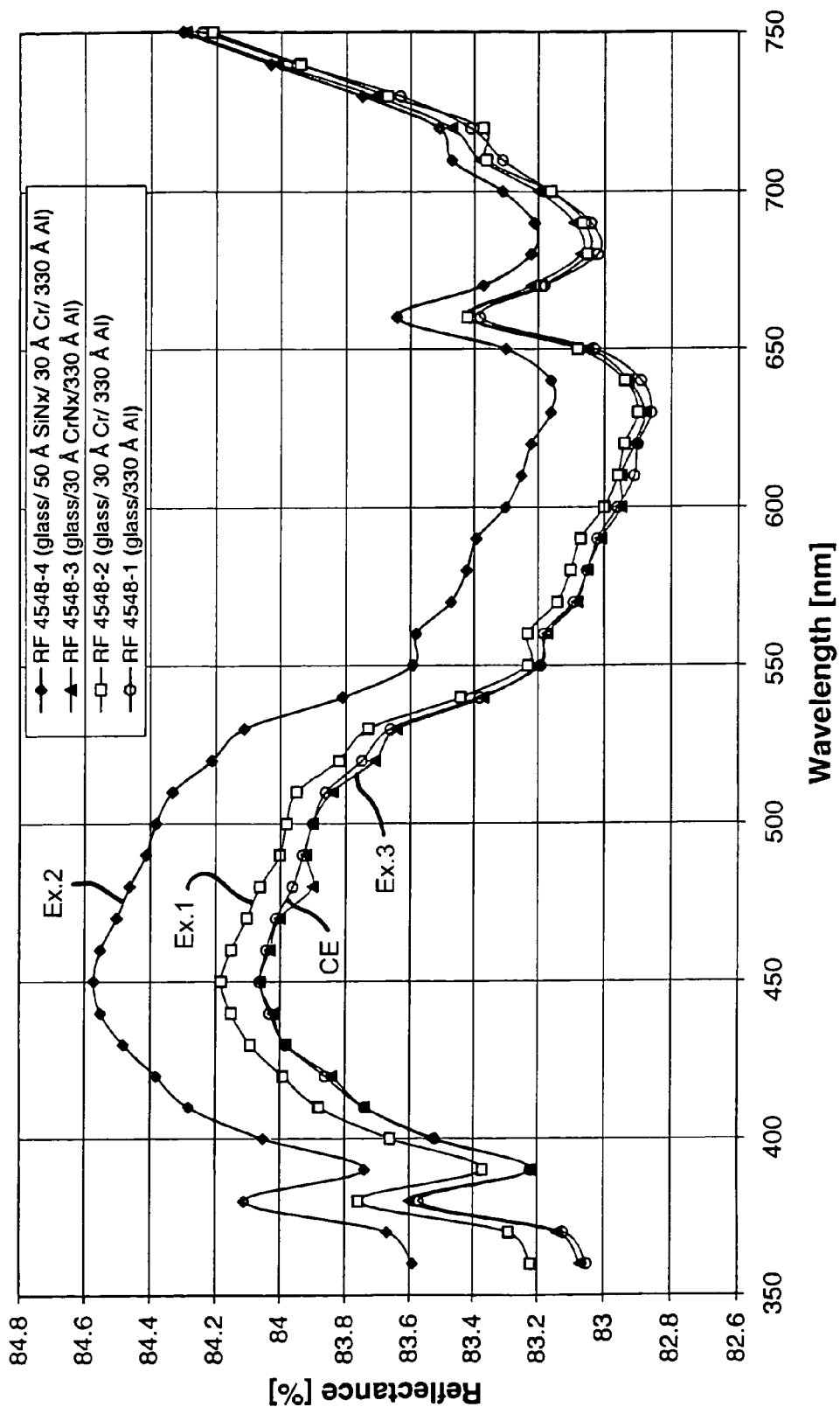
FIG. 3 is a graph comparing characteristics of first surface mirrors according to certain example embodiments of this invention with a first surface mirror not including any Cr inclusive layer.

FIG. 3 is a graph comparing the reflectivity of the first surface mirrors according to Examples 1–3 and the Comparative Example. It can be seen, for example, that the provision of the Cr and SiN layers in Example 2, and the Cr in Example 1, resulted in improved reflection compared to the Comparative Example (CE). This surprising improvement in reflection characteristics was more evident in the full layer stacks resulting from these examples. This represents a significant improvement over the prior art.

The Comparative Example was easily scratched with a light paper tissue rub, and developed clusters of large pinholes in the tape test. Moreover, the Comparative Example suffered significant damage when subjected to the cheesecloth test. In particular, when subjected to the cheesecloth test, the Al layer of the Comparative Example was almost completely removed from the glass substrate after 40 (20 double) strokes with the cheesecloth abrader. Accordingly, it can be seen that the Comparative Example was not durable and was undesirable in this regard.

Example 1 did not scratch when subjected to the paper tissue rub, and did not develop new pinholes when subjected to the tape test. Moreover, Example 1 suffered very little damage when subjected to the same number of strokes (40/20) in the cheesecloth test. Thus, it was shown that the provision of the Cr layer under the Al reflective layer resulted in much improved durability of the first surface mirror due to at least a denser Al film grown on the Cr inclusive layer.

Example 2 scratched only very slightly when subjected to the paper tissue rub, and did not develop new pinholes when subjected to the tape test. Moreover, Example 2 suffered no visible damage when subjected to the same number of strokes (40/20) in the cheesecloth test. Given that there was no visible damage when subjected to the cheesecloth test, it can be seen that provision of the silicon nitride layer under the Cr layer provides for additional unexpected durability. Thus, it was shown that the provision of the Cr and silicon nitride layers under the Al reflective layer resulted in much improved durability of the first surface mirror due to at least a denser Al film grown on the Cr inclusive layer. Furthermore, FIG. 3 shows that unexpectedly improved reflectivity is achieved when the silicon nitride inclusive layer 3 is used as in this Example 2.

Example 3 scratched only very slightly when subjected to the paper tissue rub, but developed significant pinholes when subjected to the tape test evidencing poor adhesion between the CrN and the glass. Moreover, FIG. 3 illustrates that Example 3 did not realize any significant optical improvement compared to the Comparative Example.

It is noted that when layers 9 and 11 are added to the aforesaid Examples 1–3, the durability of the coated article would improve even more, as may certain optical characteristics.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the coatings discussed herein may in some instances be used in back surface mirror applications, different materials may be used, additional or fewer layers may be provided, and/or the like.

What is claimed is:

1. A first surface mirror comprising:
   a substrate supporting a coating, wherein the coating includes at least a metallic reflective layer comprising aluminum, and a metallic layer comprising Cr that is from about 15 to 70 Å thick,
   wherein the metallic layer comprising Cr is located directly under and contacting the metallic reflective layer comprising aluminum in order to improve at least durability of the first surface mirror, and wherein the reflective layer reflects incoming light away from the substrate before the incoming light reaches the metallic layer comprising Cr,
   a low-index dielectric layer comprising silicon oxide and having an index of refraction of from about 1.4 to 1.8, located over the metallic reflective layer comprising aluminum;
   a high-index dielectric layer having an index of refraction of from about 2.2 to 2.6 located over the low-index dielectric layer;
   the first surface mirror is located in a projection television apparatus, and the first surface mirror reflects at least about 85% of incoming visible light at about 550 nm.

2. The first surface mirror of claim 1, further comprising a layer comprising silicon nitride located between the metallic layer comprising Cr and the substrate.

3. The first surface mirror of claim 1, wherein the low-index dielectric layer comprises $SiO_2$ and the high index dielectric layer comprises titanium oxide.

4. The first surface mirror of claim 1, wherein the metallic layer comprising Cr is from about 10 to 100 Å thick.

5. The first surface mirror of claim 1, wherein the reflective layer reflects incoming light back toward a viewer before the incoming light reaches the substrate.

6. The first surface mirror of claim 1, wherein the substrate comprises soda lime silica based glass.

7. The first surface mirror of claim 1, wherein the first surface mirror reflects at least about 90% of incoming visible light at about 550 nm.

8. The first surface mirror of claim 1, wherein the layer comprising Cr has a index of refraction value "n" of from 3.4 to 3.8.

9. A first surface mirror comprising:
   a substrate supporting a coating, wherein the coating includes at least a metallic reflective layer comprising Al and a metallic layer comprising Cr,
   wherein the metallic layer comprising Cr is located directly under and contacting the metallic reflective layer comprising Al, and
   a low-index dielectric layer having an index of refraction of from about 1.4 to 1.8, located over the metallic reflective layer comprising Al;
   a high-index dielectric layer having an index of refraction of from about 2.2 to 2.6 located over the low-index dielectric layer;
   wherein the first surface mirror reflects at least about 85% of incoming visible light at about 550 nm.

10. The first surface mirror of claim 9, wherein the first surface mirror is located in a projection television apparatus.

11. The first surface mirror of claim 9, further comprising a layer comprising silicon nitride located between the metallic layer comprising Cr and the substrate.

* * * * *